Patented May 16, 1939

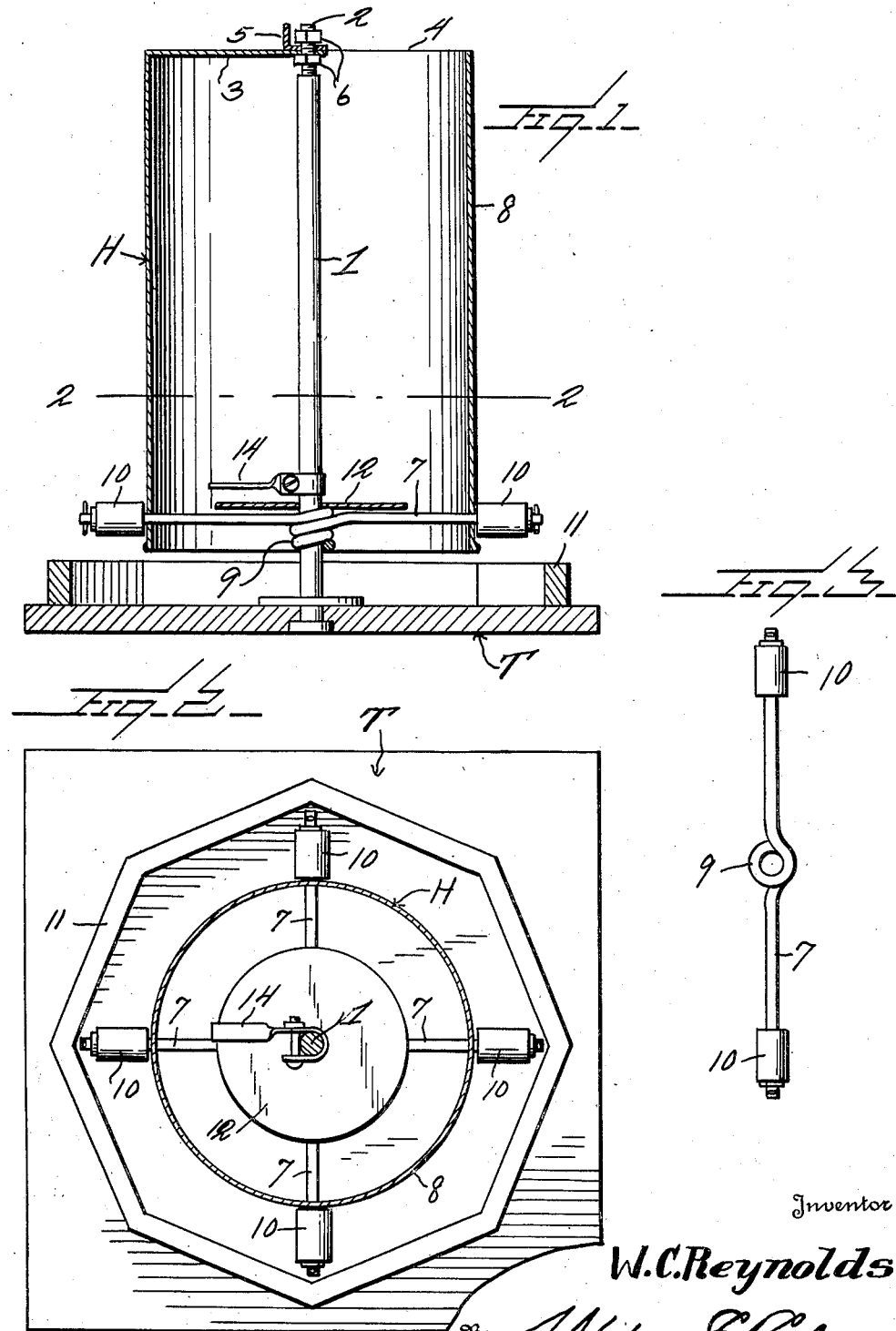

2,158,253

UNITED STATES PATENT OFFICE 2,158,253

HOG FEEDER

Walter C. Reynolds, Polo, Ill.

Application August 20, 1938, Serial No. 225,997

4 Claims. (Cl. 119—53.5)

This invention relates to a hog feeder and has relation more particularly to a device of this kind including a rotary hopper supported above a trough, and it is an object of the invention to provide a hopper with means whereby the feed may be readily delivered to the trough with a minimum of waste and wherein means are provided to effect rotation of the hopper by the rooting of the animals in the trough.

A further object of the invention is to provide a feeder of this kind including a rotatable hopper open at its bottom together with a disk supported within the lower portion of the hopper at substantially its center to carry a portion of the load of the feed within the hopper to reduce the frictional resistance offered by the feed to the rotation of the hopper, said disk also facilitating the effective delivery of the feed within the trough positioned below the hopper.

The invention consists in the details of construction and in the combination and arrangement of the several parts of my improved hog feeder whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a vertical sectional view taken through a hog feeder constructed in accordance with an embodiment of my invention;

Figure 2 is a sectional view taken substantially on the line 2—2 of Figure 1, with parts in top plan;

Figure 3 is a view in top plan of one of the rods carried by the lower portion of the hopper and extending beyond the hopper to provide means whereby the hopper is rotated by the rooting of the animals.

As disclosed in the accompanying drawing, T denotes a trough of desired dimensions and configuration and extending upwardly from the axial center of the trough is a post or column 1. The top or upper end of the column or post 1 is reduced to provide an upwardly directed threaded member 2 which is disposed through the upper closed end portion 3 of the hopper H. In the present embodiment of the invention this upper closed end 3 comprises a head which only partially closes said upper end of the hopper H whereby is provided an opening 4 to allow the feed to be readily placed within the hopper. The portion of the top or head 3 through which the member 2 is directed is provided with the reinforcing member 5 preferably a right angle beam, through which the member 2 is also directed. The member 2 is freely disposed through the head 3 and member 5 so that the hopper H will readily rotate therearound.

Threading upon the member 2 above and below the head 3 and member 5 are the members or nuts 6. By adjusting these members or nuts 6 up or down along the member 2 the hopper H may be raised or lowered with respect to the trough T as may be preferred.

In the present embodiment of my invention the hopper H is cylindrical in form with its lower or bottom end open as is clearly illustrated in Figure 1. The hopper H when in applied position has its open or lower end terminating a desired distance above the bottom of the trough T as is also shown in Figure 1. The lower portion of the hopper H is intersected by the substantially perpendicularly related rods 7 which extend outwardly beyond the side wall 8 of the hopper H. The central portion of each of these rods 7 is formed to provide a coil 9 which freely surrounds the rod 7 whereby means are provided for holding the lower portion of the hopper H against swaying.

The extended portions of the rods 7 exteriorly of the hopper H have freely mounted thereon the rollers 10. As illustrated in Figures 1 and 2, the hopper H is of such diameter and the dimensions of the rollers or sleeves 10 are such that the lower portion of the hopper H and these rollers 10 are positioned entirely above the field defined by the upstanding side wall 11 of the trough so that the rooting of the animals eating from the trough will result in such contact with the rollers or sleeves 10 as to effect a rotation of the hopper H and thus facilitate the discharge of the feed within the hopper into the trough.

Freely mounted upon the post or column 1 within the hopper H and resting from above upon the coil 9 of the uppermost rod 7 is a flat disk 12 of a radius considerably less than the internal radius of the hopper H but of a size sufficient to materially support the weight of the feed placed within the hopper H so that frictional resistance offered by the feed within the hopper to the rotation of the hopper is materially lessened thus allowing the feeder to be readily used in the feeding of shoats as well as the larger animals.

Fixed to the post or column 1 within the hopper H above and immediately adjacent to the disk 12 as an outstanding and radially disposed clearance member 14. This member 14 is non-rotatable and is herein disclosed as formed of a flat strip of metal having the major part of its extended portion one-quarter turned so that its flat faces are horizontally disposed in order to minimize the resistance offered by this member 14 to feed within the hopper as the hopper H together with the disk 12 rotates. This member 14 is of a length to terminate slightly beyond the periphery of the disk 12 and provides an effective means to clear off the feed upon the disk 12. It is to be particularly noted that this member 14 does not swing or rotate but that the feed within the hopper is moved against the member 14 as the hopper and/or the disk 12 rotates.

From the foregoing description it is thought to be obvious that a hog feeder constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A hog feeder comprising a trough, a centrally positioned upstanding column carried by the trough, a hopper rotatably mounted upon the column for rotation therearound, the lower end portion of the hopper being open, rods intersecting the lower portion of the hopper and extending outwardly therebeyond to provide means whereby the rooting of the animals in eating the feed within the trough will rotate the hopper, the central portions of the rods being so constructed and arranged to surround the column whereby the rods hold the lower portion of the hopper against swaying, a disk carried by the lower portion of the column and freely mounted thereon, said disk being of a radius less than the internal radius of the hopper.

2. A hog feeder comprising a trough, a centrally positioned upstanding column carried by the trough, a hopper rotatably mounted upon the column for rotation therearound, the lower end portion of the hopper being open, rods intersecting the lower portion of the hopper and extending outwardly therebeyond to provide means whereby the rooting of the animals in eating the feed within the trough will rotate the hopper, the central portions of the rods being so constructed and arranged to surround the column whereby the rods hold the lower portion of the hopper against swaying, a disk carried by the lower portion of the column and freely mounted thereon, said disk being of a radius less than the internal radius of the hopper, and a clearance member fixed to the column above the disk but closely adjacent thereto.

3. A hog feeder comprising a trough, a centrally positioned upstanding column carried by the trough, a hopper rotatably mounted upon the column for rotation therearound, the lower end portion of the hopper being open, rods intersecting the lower portion of the hopper and extending outwardly therebeyond to provide means whereby the rooting of the animals in eating the feed within the trough will rotate the hopper, the central portions of the rods being so constructed and arranged to surround the column whereby the rods hold the lower portion of the hopper against swaying, a disk carried by the lower portion of the column and freely mounted thereon, said disk being of a radius less than the internal radius of the hopper, and a clearance member fixed to the column above the disk but closely adjacent thereto, said member being of a length to terminate beyond the periphery of the disk.

4. A hog feeder comprising a trough, a centrally positioned upstanding column carried by the trough, a hopper rotatably mounted upon the column for rotation therearound, the lower end portion of the hopper being open, rods intersecting the lower portion of the hopper and extending outwardly therebeyond to provide means whereby the rooting of the animals in eating the feed within the trough will rotate the hopper, the central portions of the rods being so constructed and arranged to surround the column whereby the rods hold the lower portion of the hopper against swaying, a disk carried by the lower portion of the column and freely mounted thereon, said disk being of a radius less than the internal radius of the hopper, and a clearance member fixed to the column above the disk but closely adjacent thereto, said member comprising a flat strip having its flat faces horizontally arranged.

WALTER C. REYNOLDS.